United States Patent [19]

Grashow et al.

[11] 4,136,986
[45] Jan. 30, 1979

[54] AUTOMOBILE ANTENNA MOUNT STRUCTURE

[75] Inventors: Joseph Grashow, Brooklyn; Jan H. Krom, New York, both of N.Y.

[73] Assignee: Quick-Mount Manufacturing Company, Inc., Brooklyn, N.Y.

[21] Appl. No.: 808,151

[22] Filed: Jun. 20, 1977

[51] Int. Cl.² .............................................. H01Q 1/12
[52] U.S. Cl. ..................................... 403/197; 52/110; 174/153 A; 343/715; 343/888; 403/69; 403/252
[58] Field of Search .......... 174/138 A, 152 A, 153 A; 343/711, 713, 715, 882, 888, 892, 900, 901, 906; 52/110; 248/516, 539; 285/192, 208; 403/69, 84, 114, 197, 201, 252, 259

[56] References Cited

U.S. PATENT DOCUMENTS

| | | | |
|---|---|---|---|
| 2,252,671 | 8/1941 | Ludwig | 174/138 A X |
| 2,454,897 | 11/1948 | Trowbridge | 174/153 A X |
| 2,509,563 | 5/1950 | Grashow | 174/153 A |
| 2,536,053 | 1/1951 | Grashow | 174/153 A |
| 2,693,333 | 11/1954 | Race et al. | 174/153 A X |
| 2,727,766 | 12/1955 | Grashow | 174/153 A X |
| 2,758,151 | 8/1956 | Spector et al. | 174/153 A X |
| 2,917,743 | 12/1959 | Grashow | 174/153 A X |
| 2,953,630 | 9/1960 | Cejka | 174/153 A |
| 3,138,661 | 6/1964 | Grashow | 174/153 A |
| 3,977,005 | 8/1976 | Cejka | 343/715 |

Primary Examiner—Laramie E. Askin
Attorney, Agent, or Firm—Brumbaugh, Graves, Donohue & Raymond

[57] ABSTRACT

An automobile antenna mounting structure comprises a base supporting and electrically insulating an antenna mast, the base extending through a bore of laterally elongated cross-section in a lower mounting plate, a circular mounting aperture in a mounting surface, and a bore of laterally elongated cross-section in an upper mounting means, respectively. A pair of downwardly concave shouldered portions on the base support a pair of downwardly depending legs on the lower mounting plate, so formed to permit limited relative pivotal movement between the base and plate in a vertical plane. The base and lower mounting plate are further formed to be both insertable through the mounting aperture in the support surface from the exterior thereof. The lower mounting plate and upper mounting means are adapted to be clamped to the support surface by a nut threaded on the upper portion of the base. The nut is formed with a hemispherical lower portion and the upper mounting means is formed with a correspondingly shaped seat at its upper end communicating with the bore therein so that the mast can be securely mounted on the support surface at a predetermined angle thereto.

7 Claims, 4 Drawing Figures

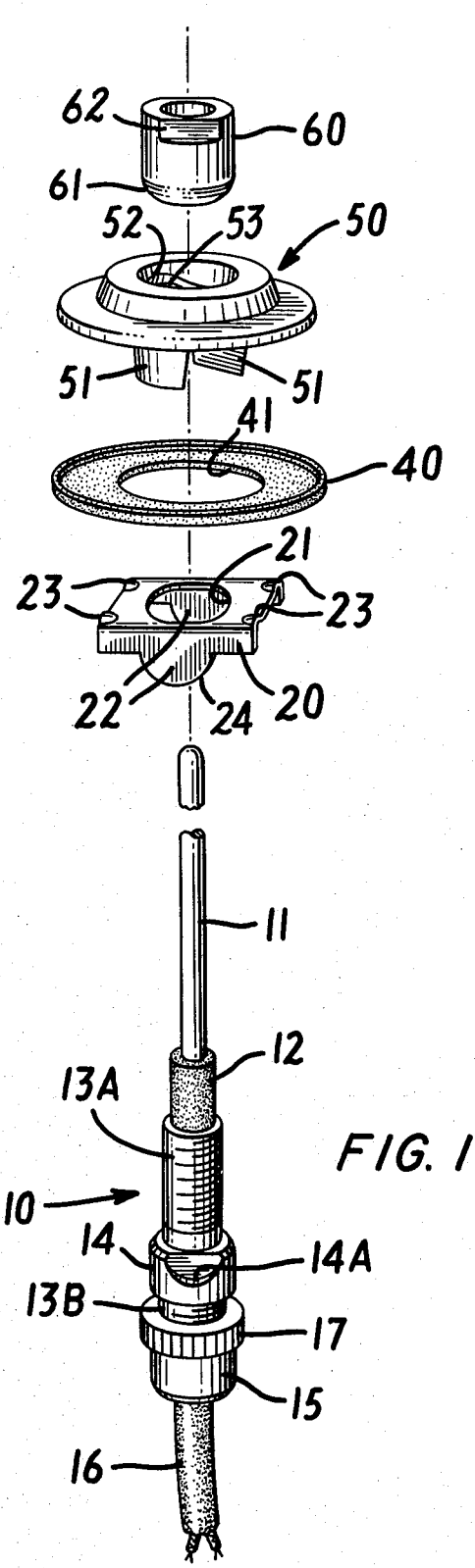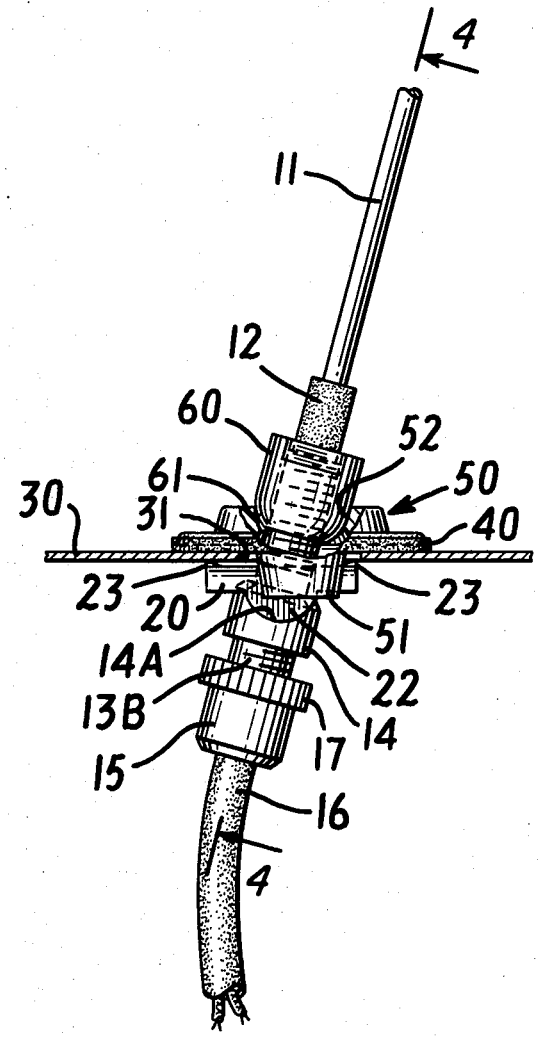
FIG. 1
FIG. 3

AUTOMOBILE ANTENNA MOUNT STRUCTURE

BACKGROUND OF THE INVENTION

The present invention relates to automobile antenna mountings and more particularly to means for mounting an automobile antenna securely in an upright position on the body of an automobile.

Antenna mounting structures have been proposed heretofore which enable an automobile antenna to be secured on the surface of an automobile from the exterior thereof. For example, U.S. Pat. No. 2,536,053 to Grashow shows an automobile antenna mounting structure in which a pair of pivotable bars on an antenna mounting base are inserted endwise through a hole in an automobile surface and then turned so as to extend transversely of the base to prevent the base from being retracted through the hole. A generally wedge-shaped supporting ring is placed over the end of the base projecting through the hole and a nut is threaded onto the upper end of the base over the ring. The nut retains the assembly securely to the surface, the assembly first being rotated to bring the antenna to an upright position before the nut is tightened down.

U.S. Pat. No. 3,138,661 to Grashow discloses another antenna mounting in which the base has a transverse plate affixed thereto and the base and plate can be inserted through the mounting hole by tilting the assembly to the vertical. The assembly is clamped to the automobile surface by an antenna socket body secured at the upper end of the base, a gasket mount being interposed between the socket body and the upper surface of the automobile body. A separate pivotable mount on the socket body provides for angular displacement of the antenna mast to enable it to be securely mounted in an upright position.

U.S. Pat. No. 2,727,766 to Grashow discloses a similar antenna mounting structure in which the lower clamping member is a generally oblong bar having an elliptical opening therein through which the base extends with the long sides of the bar resting on shouldered portions formed on the base member. When so positioned, the bar prevents the retraction of the base through the mounting hole.

Although the prior art devices discussed above are effective in many applications, there is a need for an automobile antenna mounting that can be assembled to a vehicle entirely from the exterior thereof to mount an antenna securely in an upright or other desired position on any of the intricate body designs and within the stringent space limitations of the modern automobile.

SUMMARY OF THE INVENTION

According to the present invention, an automobile antenna mounting structure comprises a base for supporting the antenna mast extending successively through a bore of laterally elongated cross-section in an elongated lower retainer, a circular mounting aperture in a mounting surface, and a bore of elongated cross-section in an upper retainer, respectively. A pair of downwardly concave shouldered portions on the base support a pair of spaced apart downwardly dependent legs on the lower retainer having bearing portions shaped to match the shouldered portions of the base so as to facilitate relative pivotal movement of the base and plate when in assembled relation. With this construction, the lower retainer can be tilted on the mast and inserted through a mounting hole in a supporting surface, after which the antenna and base can be raised with respect to the supporting surface to bring the upper surface of the lower retainer in close engagement with the under surface of the supporting surface and with the retainer legs snugly engaging the concave shouldered portions on the base so that retraction of the retainer and base through the mounting hole is prevented.

The upper end of the mounting base extends outwardly through the mounting hole in the supporting surface and passes through a bore in the upper retainer, and the base and lower retainer are clamped to the upper retainer with the mounting surface therebetween by a nut threaded on the upper portion of the base. The nut is formed with a hemispherical lower portion which is adapted to fit snugly in a similarly shaped seat formed above the bore in the upper retainer, thereby enabling the mounting position of the antenna to be adjusted relative to the supporting surface prior to tightening the nut. At the same time, however, the contacting surfaces between the automobile body and the upper and lower retainers remain parallel, so that the antenna is tightly clamped to the automobile body.

BRIEF DESCRIPTION OF THE DRAWINGS

For the purpose of illustrating the invention, reference is made to the accompanying drawings, in which:

FIG. 1 is an exploded perspective view of the parts constituting an antenna mount constructed according to the invention;

FIG. 3 is a side view, partly in section, of the antenna mount of FIG. 1 assembled in an aperture formed in an automobile body.

DESCRIPTION OF A PREFERRED EMBODIMENT

Figure 2:
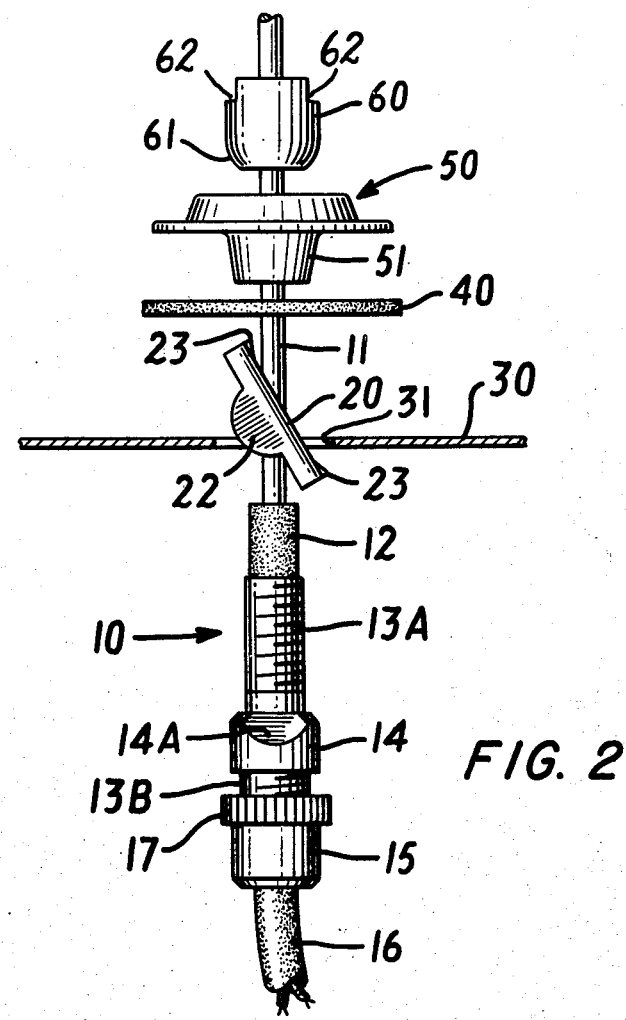
FIG. 2 is a side view illustrating the antenna mount of FIG. 1 during one stage of a mounting operation.

Referring to FIG. 1, an automobile antenna mounting structure is illustrated comprising an antenna base assembly 10, an elongated lower retainer such as a generally rectangular plate 20, a disc insulator 40, an upper retainer 50, and a threaded nut 60.

The antenna base assembly 10 has a mast 11, the lower end of which extends through a generally tubular base 14 formed of a conducting material. The mast 11 is fitted within and secured to the base by means of an insulator sleeve 12 disposed within the longitudinal bore of the base 14. The base is formed with an upper threaded section 13A of reduced diameter, and a lower threaded section 13B. A pair of diametrically opposed downwardly concave and circular shouldered portions 14A are formed in the non-threaded portion of the base 14. A conventional coaxial antenna cable 16 is adapted to be connected at one end to a radio (not shown) and has a conventional coaxial connector 15 at its free end for connecting the cable 16 to the lower end of the antenna 11. The base 14 is formed at its lower end so as to engage the connector 15, and the lower end of the mast 11 is positioned within the longitudinal bore of the base 14 to engage the connector 15, the connector 15 and base 14 being secured together by means of the usual threaded coupling 17.

The lower retainer or mounting plate 20 is preferably made of metallic material and is of generally rectangular shape. It is formed with a bore 21 of laterally elongated cross-section, the major axis thereof being disposed lengthwise of the plate, and has a pair of downwardly depending legs 22 having bearing portions 24 shaped generally to match the concave shouldered portions 14A and to be supported thereby. The length of the plate 20 is greater than the diameter of the mounting hole in the automobile body in which the antenna is to be mounted and the width of the plate 20 is less than the hole diameter. The width of the opening 21 is slightly larger than the diameter of the threaded section 13A of the base 10. The upper surface of the plate 20 is preferably provided with means such as biting points 23 at the four corners which, when the nut 60 is tightened down, grip the underside of the surface on which the antenna is mounted.

The upper mounting means 50 is also preferably of metallic material and it has a flat underside from which extend a pair of spaced apart downwardly depending legs 51. Within the mounting means 50 is a longitudinal bore 53 of laterally elongated cross-section communicating at its lower end with the space between the legs 51 and at its upper end with an enlarged concave or socket portion 52 adapted to form an effective seat for the nut 60. The minor axis of the bore 53 is perpendicular to the legs 51 and the width of the bore 53 along the minor axis is slightly larger than the threaded section 13A of the base 10. The opposed inside surfaces of the legs 51 are flat, and spaced to accommodate, in loose sliding contact therebetween, the outside surfaces of the legs 22 of the plate 20 when the apparatus is assembled. The outside surfaces of the legs 51 are concentrically cylindrical and sized to fit in the circular mounting aperture 31 (FIG. 3).

The disc insulator 40, formed of rubber or other suitable moisture-sealing material, has a circular aperture 41 slightly larger in diameter than the circle defined by the cylindrical outer periphery of the legs 51.

The threaded nut 60 is provided with a lower portion 61 of generally hemispherical shape, which is adapted to be snugly received in the correspondingly shaped socket 52 and tightly seated therein when the nut 60 is tightened down. The nut may also be formed with a pair of diametrically opposed flats 62 to facilitate the application of a tool in tightening it down.

Preparatory to mounting the antenna assembly of the invention to the body of an automobile, and referring primarily to FIG. 2, a circular mounting aperture 31 is drilled into the automobile body 30, of a size suitable for receiving the legs 51 of the upper retainer 50. The cable connector 15 is attached to the base 14 by the coupling 17, and the cable 16 and a portion of the base 14 are fed through the aperture 31. The base 10 is lowered through the hole 31 to a point where the insulator sleeve 12 is below the opening. The mast 11 of the antenna is then inserted through the opening 21 in the plate 20, and the plate is thereafter tilted and pushed endwise through the circular mounting aperture 31, as shown in FIG. 2, and allowed to drop onto the base. The plate 20 is then manipulated to position the legs 22 on the shouldered portions 14A for support thereby. The base 10 is then pulled back up through the aperture 31 to the point where the lower plate 20, now essentially horizontal, rests against the underside of the mounting surface 30.

Figure 4:
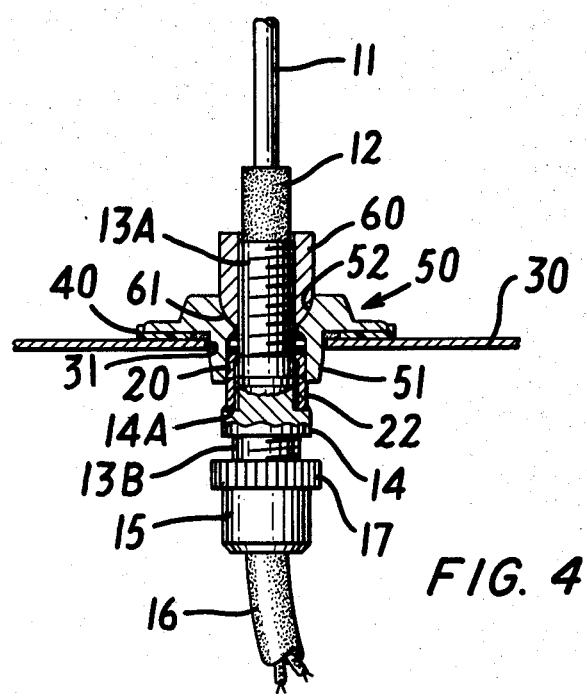
FIG. 4 is a view, partly in section, taken along the line 4—4 of FIG. 3 looking in the direction of the arrows.

The disc insulator 40 and the upper retainer 50 are slipped over the mast 11 in that order, and come to rest with the insulator 40 sandwiched between the retainer 50 and the mounting surface 30, the legs 51 of the former being disposed within the circular aperture 31 and facing the legs 22 on the plate 20, as best shown in FIG. 4. Finally, the nut 60 is slipped over the mast 11 and screwed onto the threaded section 13A of the base 14 until it is loosely seated in the socket 52 in the upper retainer 50.

As assembled thus far, relative rotation of the base 14 and the plate 20 is prevented by the engaged shouldered portions 14A and legs 22, and relative rotation of the plate 20 and upper retainer 50 is likewise prevented by the legs 51 on the latter nested over the legs 22 on the plate 20. At the same time, however, angular displacement between the base 20 and the mounting surface 30 is possible in a direction parallel to the legs 22. Upon tilting of the mast 11, the nut 60 is also tilted within the socket 52; however, since the shape of the latter matches the shape of the hemispherical lower portion 61 of the nut 60, the nut 60 remains snugly seated in the socket 52. Also, the bearing portions 24 of the legs 22, engaging the shouldered portions 14A, permit relative angular displacement between the base 14 and the plate 20. As the mast 11 is tilted in one direction, the plate 20 slides in the opposite direction to compensate, and the legs 51 of the upper retainer 50 retain the plate 20 in alignment as it slides. The elliptical shapes of the bore 53 through the upper mounting means 50 and the bore 21 through the plate 20 provide the clearance necessary to permit the passage of the threaded section 13A of the base 14 therethrough at an angle without interference from the sidewalls of the bores.

The antenna may therefore be positioned by a combination of tilting the mast and rotating the entire base assembly, which at this point is only loosely clamped in the aperture 31. Once the mast is in the desired position, the nut 60 is tightened down hard. Due to the curved socket 52, the nut 60 may be tightened with the antenna tilted with respect to the support surface, and the clamping force thus applied also causes the biting points 23 to dig into the underside of the mounting surface 30, thereby preventing movement of the base assembly relative to the support surface and resulting in a sturdy mounting.

The form of the invention described herein by way of illustration is susceptible of modification in form and detail within the spirit of the invention. All such modifications and variations are intended to be encompassed within the scope of the invention as defined in the following claims.

We claim:

1. An antenna mounting structure for mounting an antenna within an aperture formed in a support surface comprising:
   a base for supporting the antenna having laterally spaced-apart shouldered portions thereon, said shouldered portions curved in a vertical plane;
   elongated lower retainer means adapted to pass endwise through the support surface aperture and having a longitudinal bore of laterally elongated cross-section therethrough;
   a pair of spaced apart downwardly depending legs on said lower retainer means having bearing portions shaped to match the shouldered portions on the base and arranged to provide pivotal engagement between said base and said lower retainer means;
   upper retainer means having an opening therein through which said base is adapted to extend; and
   means for clamping the base and lower retainer means to the upper retainer with the support surface therebetween and a portion of the base extending through the lower and upper retainer means and the aperture in said surface.

2. An antenna mounting structure as defined in claim 1, wherein the opening in the upper retainer means comprises a bore extending therethrough of elongated lateral cross-section corresponding with the bore of the lower retainer means, and wherein the clamping means comprises a threaded nut adapted to cooperate with a threaded upper portion of the base.

3. An antenna mounting structure for mounting an antenna within an aperture formed in support surface comprising:
 a base for supporting the antenna having laterally spaced-apart curved shouldered portions thereon;
 elongated lower retainer means adapted to pass endwise through the support surface aperture and having a longitudinal bore of laterally elongated cross-section therethrough;
 spaced apart downwardly depending legs on said lower retainer means having bearing portions shaped to match the shouldered portions on the base;
 upper retainer means having an opening therein through which said base is adapted to extend, wherein the opening in the upper retainer means comprises a bore extending therethrough of elongated lateral cross-section corresponding with the bore of the lower retainer means, and the upper portion of said bore terminates in a socket having a generally hemispherical shape; and
 means for clamping the base and lower retainer means to the upper retainer means with the support surface therebetween and a portion of the base extending through the lower and upper retainer means and the aperture in said surface, wherein the clamping means comprises a threaded clamping nut adapted to cooperate with a threaded upper portion of the base, said threaded clamping nut having a lower portion of generally hemispherical shape to conform to said socket in said upper retainer means, in which socket said nut lower portion is adapted to be tightly seated.

4. An antenna mounting structure as defined in claim 3, wherein the shouldered portions on the base are downwardly concave and circular.

5. An antenna mounting structure as defined in claim 4, wherein the upper retainer means has downwardly depending legs formed for insertion through the mounting surface aperture, and spaced apart to accommodate the legs of the lower retainer means therebetween.

6. An antenna mounting structure as defined in claim 5, wherein the lower retainer means has means to inhibit movement between the lower retainer means and the support surface when the nut is tightened down.

7. An antenna mounting structure as defined in claim 3, wherein said lower retainer means has a pair of said legs, and said legs and said shouldered portions are arranged to provide pivotal engagement between said base and said lower retainer means.

* * * * *